United States Patent
Goodwin

(10) Patent No.: US 8,442,793 B2
(45) Date of Patent: May 14, 2013

(54) SYSTEM FOR DETERMINING QUALITY OF A ROTATING POSITION SENSOR SYSTEM

(75) Inventor: William Russell Goodwin, Farmington Hills, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 338 days.

(21) Appl. No.: 12/892,447

(22) Filed: Sep. 28, 2010

(65) Prior Publication Data

US 2012/0078564 A1 Mar. 29, 2012

(51) Int. Cl.
*G01C 19/24* (2006.01)
*G01C 25/00* (2006.01)
*G06F 19/00* (2011.01)

(52) U.S. Cl.
USPC ......... 702/116; 73/146; 324/207.25; 702/151

(58) Field of Classification Search .................... 702/38, 702/64, 93, 94, 115, 116, 119, 120, 123, 702/151, 163, 183; 73/146; 324/207.25; 68/12.02
See application file for complete search history.

(56) References Cited

U.S. PATENT DOCUMENTS

| | | | | |
|---|---|---|---|---|
| 5,497,084 | A | * | 3/1996 | Bicking .................. 324/207.25 |
| 2005/0229690 | A1 | * | 10/2005 | Kikuchi et al. ................. 73/146 |
| 2008/0134727 | A1 | * | 6/2008 | May ............................. 68/12.02 |
| 2010/0057396 | A1 | * | 3/2010 | Oblizajek et al. ............. 702/147 |
| 2010/0219817 | A1 | * | 9/2010 | Galka et al. .............. 324/207.25 |

OTHER PUBLICATIONS

Infineon Technologies AG, "Programable True Power on Sensor" Data Sheet Version 1.1, TLE4984C-HT E6747, http://www.infineon.com/products/sensors, Aug. 6, 2008, 29 Pgs.

* cited by examiner

*Primary Examiner* — John H Le
(74) *Attorney, Agent, or Firm* — Julia Voutyras; Alleman Hall McCoy Russell & Tuttle LLP

(57) ABSTRACT

A method for improving a position sensing system which measures a rotating object is presented. In one embodiment, the method outputs the position of the rotating object while the object is rotating, and the method follows an external command on the sensor output line when the object is not rotating to output information other than the position information.

20 Claims, 7 Drawing Sheets

SYSTEM FOR DETERMINING QUALITY OF A ROTATING POSITION SENSOR SYSTEM

FIELD

The present description relates to a system for improving the determination of a quality of a rotary position sensing system. The system may be particularly useful to ensure that a specific production assembly has been built properly or to diagnose degraded sensor systems in the field.

BACKGROUND AND SUMMARY

Accurate and reliable position information related to rotating objects is desirable for many applications. For example, engine position information can be important to operate an engine with low emissions and high efficiency. In particular, by knowing an accurate engine position, it is possible to precisely time fuel injection and spark as well as provide proper emissions monitoring through high level functions such as misfire detection by instantaneous speed misfire methods. Therefore, it is desirable to assure that a position sensing system has sufficient operating margin to provide proper position information over potential operating conditions including vibration, temperature and high rotational speeds.

One sensing technology used for determination of engine position is with a variable reluctance transducer. Variable reluctance engine position sensors output a sinusoidal signal that has an amplitude and frequency that are proportional to the speed of the rotating object (e.g., an engine flywheel) relative to the position sensor. However, the output of a variable reluctance sensor can be affected by many variables including the proximity of the sensor to the moving object, the magnetic circuit in the sensor, and the properties of the sensed target. The most significant factor other than speed is the sensor distance to the target, normally referred to as airgap. A variable reluctance system is easy to check for proper build quality as the sensor voltage can be measured during normal engine functional testing. For example, a voltage acceptance criterion can be applied and used to statistically track the quality performance of the engine sensing system. Using this method it is possible to provide voltage threshold limits that can be used to detect errors in the build quality such as a sensor that is not fully installed or a rotating target that is damaged.

Variable reluctance technologies are quickly being replaced by more advanced sensor technologies. One reason variable reluctance technology are being replaced is because they require more complex input circuits in the interfacing module, usually an engine or powertrain control module. Additionally, variable reluctance sensors have required more significant characterization and calibration effort to assure proper lifetime performance.

On the other hand, Hall Effect and giant magneto resistive (GMR) sensors are becoming the typically applied technologies. Hall and GMR sensors provide a simpler output signal which allows for a less complex input circuit in the control module as well as a reduced amount of characterization and calibration effort. Due to the simplified sensor output characteristics, the detection of sensor system degradation at the manufacturing location of the engine is not as robust as for other types of sensors. The sensor signal provides a way to detect if the sensor is functioning at the specific conditions tested but variable data is not available to ensure that the sensing system has sufficient margin for a range of operating characteristics.

In all of these sensors, the primary principle of sensing is to sense a changing magnetic field around the sensing element that is caused by the rotation of the metallic target in front of the sensor. In the variable reluctance sensors, as noted above, this magnetic variability can be directly measured on the finished engine assembly. In the case of the Hall Effect and GMR technologies, it is desirable to obtain the magnetic profile information on the finished engine assembly. Toward this end, the inventor has proposed a method for the measurement of the speed sensor magnetic profile.

The inventor herein has recognized the above-mentioned issues with advanced sensor technologies and has developed a method for determining data associated with quality of a magnetic sensor profile. In one embodiment, present description includes a method for assessing operation of position sensor, comprising: during rotation of an object sensed by a position sensor, storing data associated with quality of a magnetic sensor profile within the position sensor, and outputting position data via a pin of the position sensor; and during non-rotation of the object, outputting at least a portion of the data associated with quality of the magnetic sensor profile via the pin.

By storing data associated with quality of a magnetic sensor profile within a position sensor it may be possible to better assess operation of an advanced position sensor that outputs a modified object position. Further, a sensor that has the capability to output internally measured parameters and diagnostic codes that can reduce the time to diagnose a degraded sensor. Further still, a sensor that outputs two different types of information during two different operating modes through a single output can reduce wiring costs and system complexity.

The present description may provide several advantages. For example, the approach provides for gathering and reporting quality of a magnetic sensor profile that is not otherwise available. Further, the signal quality data may include information related to each tooth of the sensed object so that signal degradation can be isolated to specific sensor system elements. Further still, the approach allows sensor system operation to be verified after manufacturing.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
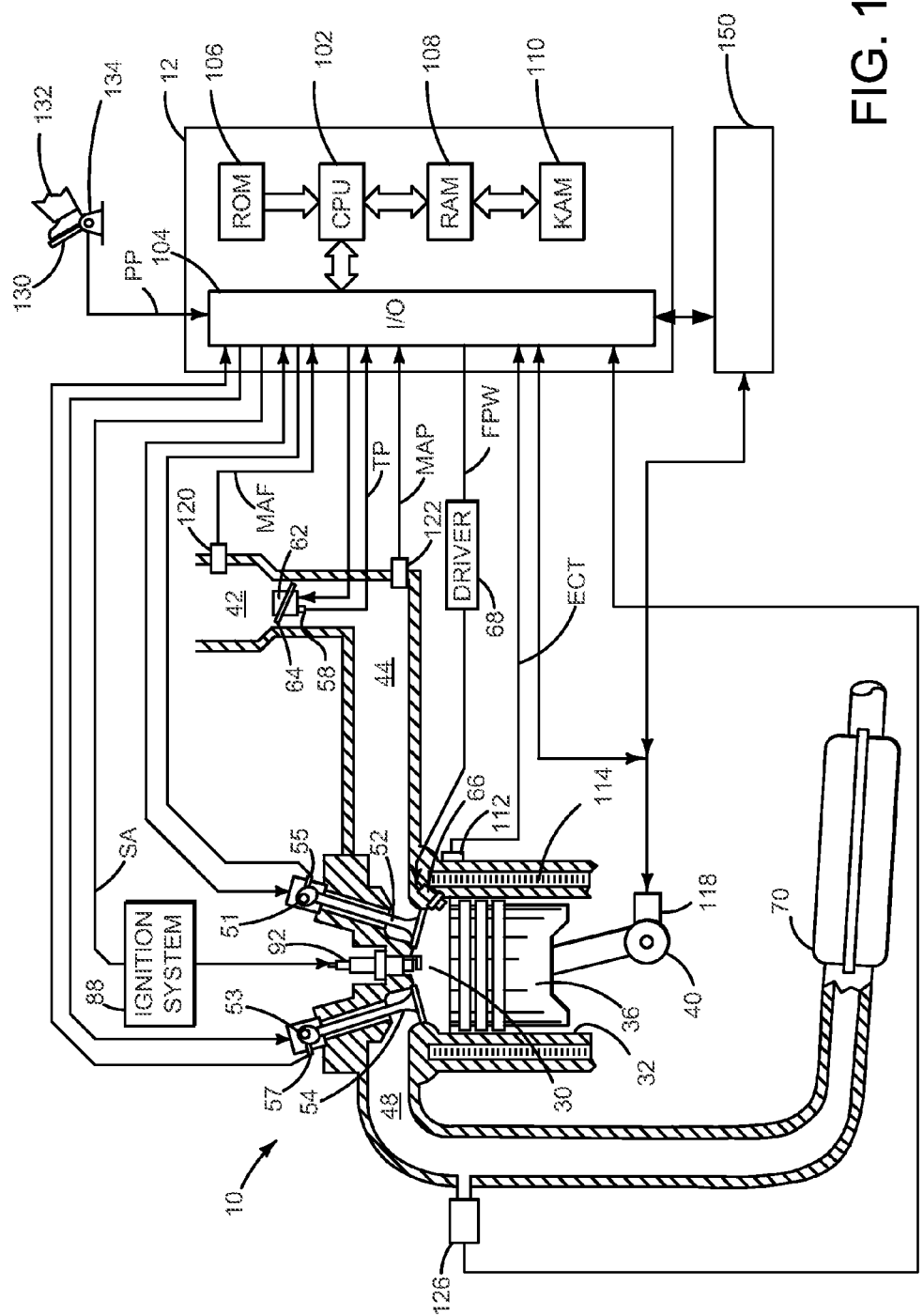
FIG. 1 is a schematic diagram of an engine and engine position sensing system.
Figure 2:
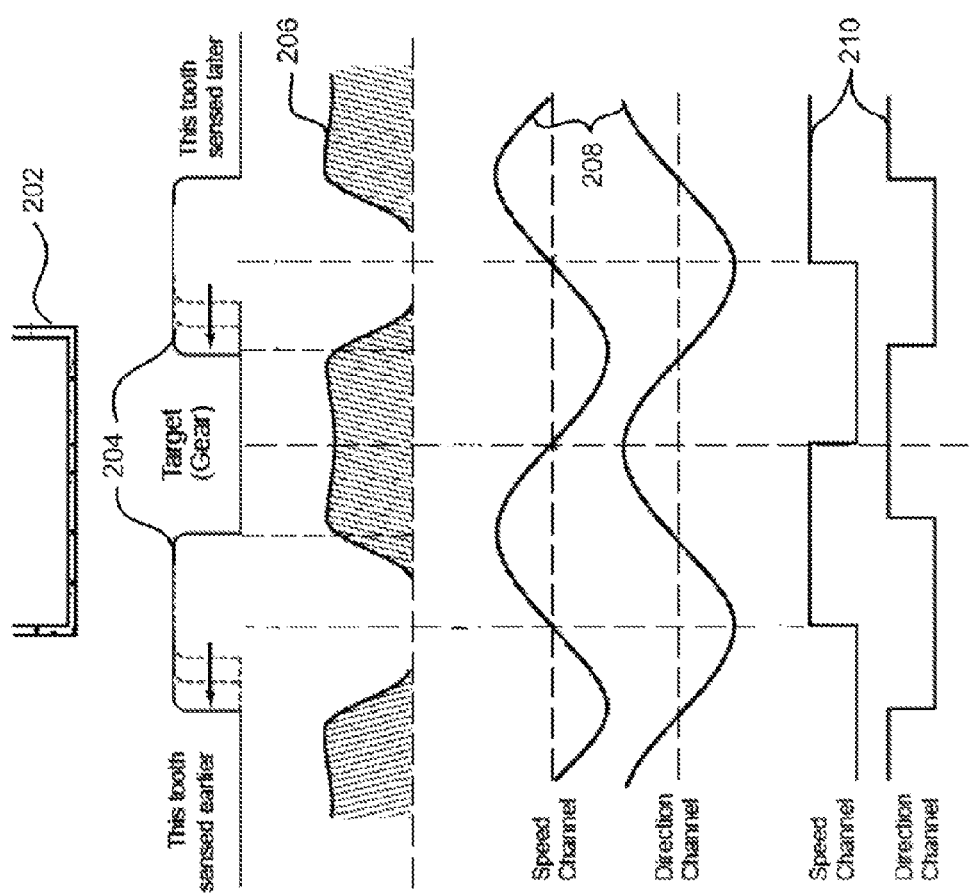
FIG. 2 shows simulated signals of a position sensing system.
Figure 3:
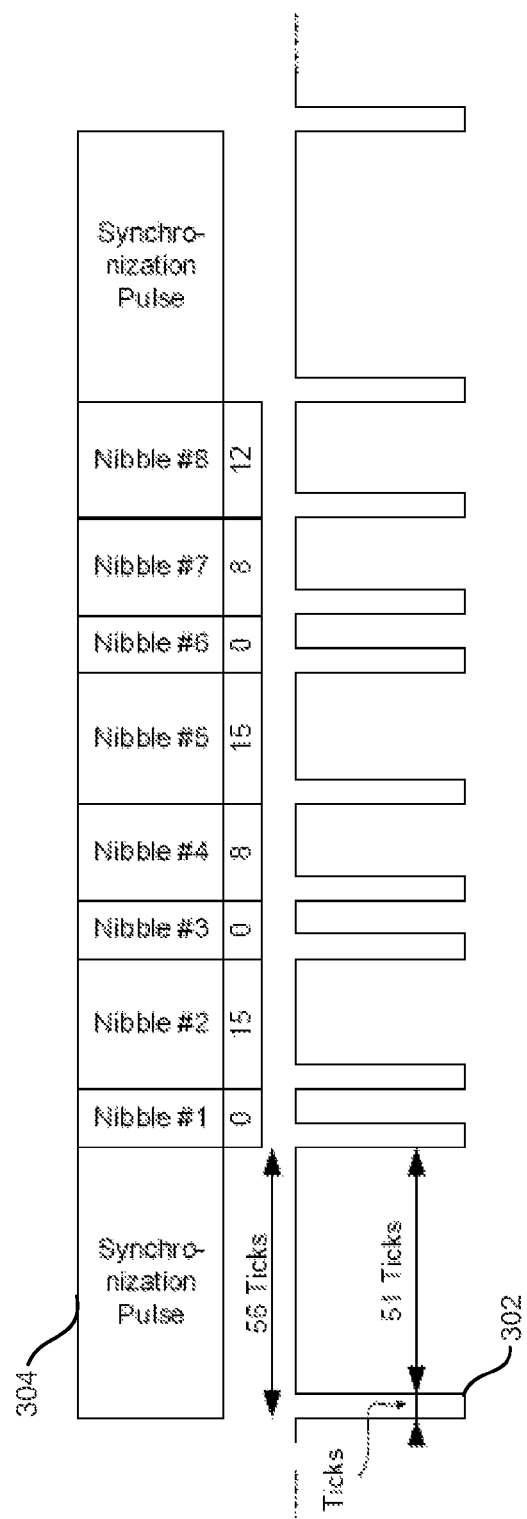
FIG. 3 shows an example data transfer sequence between a position sensing system and a diagnostic controller.
Figure 4:
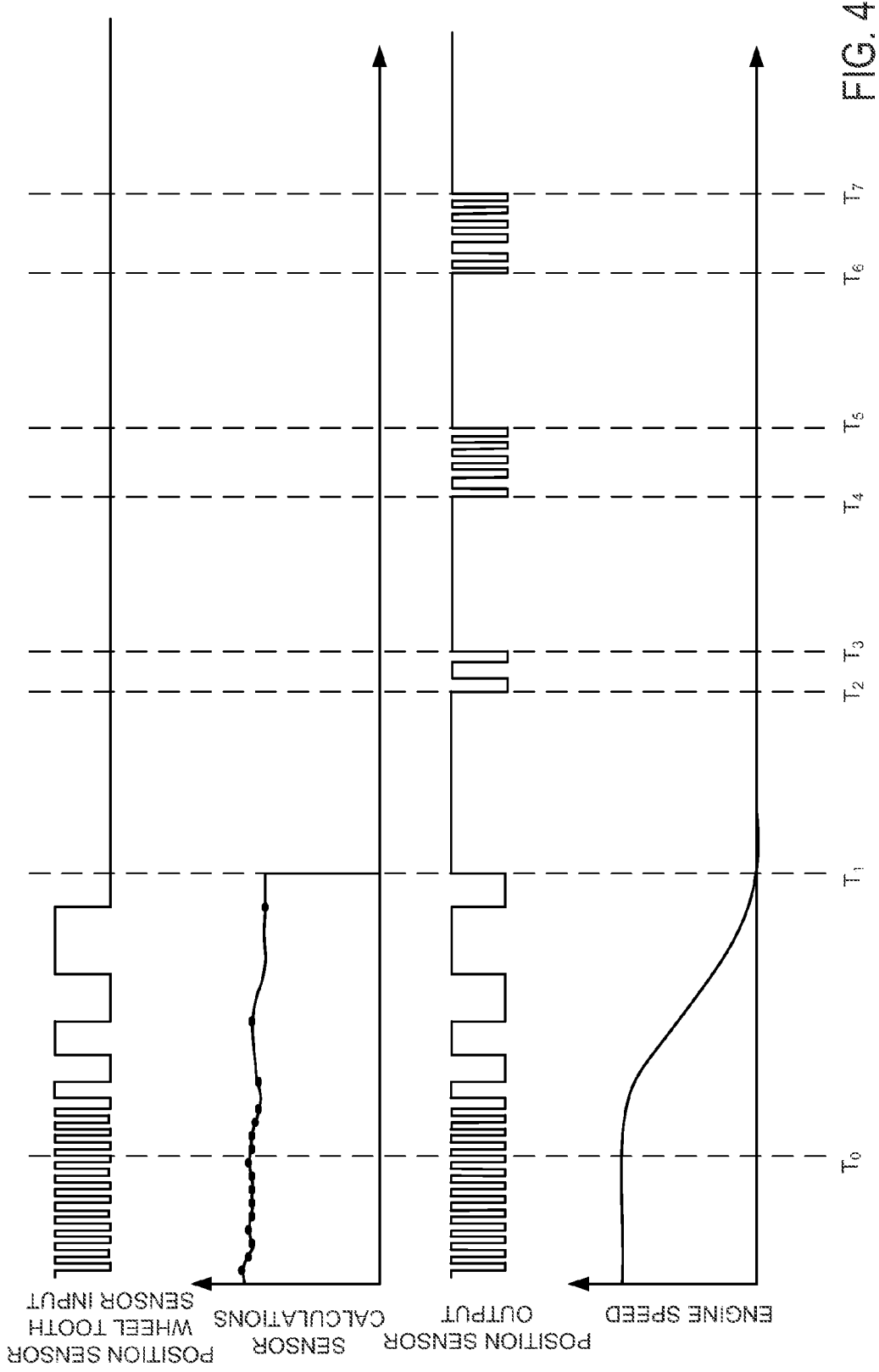
FIG. 4 shows simulated signals of interest for a position sensor during an engine stop.

The present description is related to a sensor for determining the quality of a magnetic sensor profile. In one non-limiting example, FIG. 1 shows an advanced position sensor within an engine system. FIG. 2 shows an example magnetic sensor profile and signals within the advanced position sensor when a position of an engine is sensed, for example. The quality of the magnetic sensor profile may be output to an external system or controller as illustrated in FIG. 3 by the circuitry shown in FIG. 5. The sensor data is available to an external system after sensing a position of an object as shown in FIG. 4. provides an example data output sequence from and advanced position sensor. The position sensor and the external controller receiving position sensor information may be operated according to the methods of FIGS. 6 and 7.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from air intake 42 to intake manifold 44. In one example, a low pressure direct injection system may be used, where fuel pressure can be raised to approximately 20-30 bar. Alternatively, a high pressure, dual stage, fuel system may be used to generate higher fuel pressures.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, controller 12 is in bi-directional communication with an engine position sensor 118 which senses position of crankshaft 40. Further in some examples, engine position sensor 118 is in bi-directional communication with a diagnostic controller 150 (e.g., see FIG. 3 for example of bi-directional communication circuitry). In other embodiments, diagnostic controller 150 may communicate to engine controller 12 to retrieve a data related to quality of the magnetic sensor profile.

Engine controller 12 and diagnostic controller 150 include outputs that can adjust the state of the output of engine position sensor 118. In one example, engine position sensor 118 has an output that can be forced to a defined logic level when engine position sensor 118 is not detecting rotation of an object. For example, the output of engine position sensor 118 can be set to a high logic level when rotation of an object is not detected by engine position sensor 118. In one example, the high logic level is provided by way of a resistor tied to a high logic level voltage. Engine position sensor 118 may also configured with an input that monitors the state of the engine position sensor output. In one example, the input is an input to a logic device, an AND or OR gate for example. Whenever the output changes state, whether by actions of the position sensor or an external controller, the position sensor input registers the change in state. An external controller can change the state of the engine position sensor 118 by coupling one side of the resistor tied to the high logic level voltage to ground, through a transistor for example. Thus, when the transistor in the external controller closes the external controller forces the input of position sensor 118 to go to a low level logic state. The input of sensor 118 remains at a high level logic state when the transistor in the external controller is in an open state. In this way, the external controller can communicate instructions to the position sensor 118 when the position sensor 118 is not detecting a rotating object.

In some examples, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

Referring now to FIG. 2, simulated signals of a position sensing system are shown. Position sensor 202 senses metallic teeth 204 of a target that pass by sensor 202 in either a forward or reverse direction. A target magnetic profile 206 of the target is produced by position sensor 202. Sinusoidal waveforms 208 representing a speed channel and a direction channel are derived from the target magnetic profile 206. In addition, digital output signals 210, provide target position information to external systems.

The sensor of FIG. 2 has advanced algorithms to evaluate the magnetic profile of the target (e.g. a tooth wheel) and to adjust the internal amplification and thresholding of the signal processing. The position sensor uses a combination of algorithms and adjusted values to provide the processed square wave signals (e.g., 210) that is output from the sensor. The square wave processing masks the actual magnetic waveform for the circuit that would be an indication of signal health. Thus, by storing attributes of the target magnetic profile 206 it is possible to determine whether the position sensor is operating as desired.

Referring now to FIG. 3, an example data transfer sequence between a position sensing system and a diagnostic controller is shown. Communication signal 302 may be transmitted via a single communication link between a position sensor and a diagnostic controller. Identification table 304, describes the pulses of communication signal 302 positioned immediately below. The duration of the pulses that represent nibbles 1-8 can be adjusted to change data represented by nibbles 1-8.

In this example, after a rotation event as observed by a position sensor has ceased, and while the sensor is powered, the position sensor is available to enter a diagnostic command mode. The diagnostic controller sends a digitized signal with sufficient encoding to ensure random electrical noise may not institute the diagnostic command mode. In particular, the diagnostic controller outputs a synchronization pulse to develop an initial condition for waking up the position sensor diagnostic command mode and for providing a time base for measuring all successive pulses. Nibble information from the diagnostic controller (e.g., a read module) follows the synchronization pulse. The nibble information is provided in a unique pattern that is defined sufficiently to confirm that the communication is not a noise pulse, but rather a deliberate signal being provided to the sensor. In one example, the rate of the signal information is approximately 3 usec per tick event.

Following a valid request for information, the position sensor sends the requested digital information back to the diagnostic controller. The process to communicate from the position sensor to the diagnostic controller is similar to the initial command to the diagnostic controller. In particular, an initial synchronization pulse is sent by the position sensor to the diagnostic controller and then sensor data follows in nibble sets of data. In one example, the data transferred from the position sensor indicates the amplification level of the internal algorithm. Further, information regarding peak values for each of the magnetic teeth of the target is sent to the diagnostic controller in succession. Data is provided for up to a number of expected teeth for the target wheel. In one example, 58 distinct sets of tooth information are provided.

Three exit conditions from the diagnostic command mode are provided; removal of power from the sensor, a new digital pulse from the read module that commands the sensor to return to normal function, or the restarting of rotation of the engine, as sensed by the sensor.

The above described communication approach is also valid for implementation into a production control module (e.g., controller 12 of FIG. 1). In addition, features are provided for sending position sensor internal diagnostic information back to the diagnostic controller. Further, the approach may be used to update sensor calibration values, if desired.

Referring now to FIG. 4, simulated signals of interest of a position sensor during an engine stop are shown. In particular, the signals are related to an engine position sensor configured to sense the position of a rotating engine crankshaft. The first plot from the top of FIG. 4 shows the position sensor wheel tooth sensor input to the position sensor from an engine fly wheel or other gear tooth, for example. The second plot from the top of FIG. 4 shows an example of calculations performed within the sensor. In one example, the calculations are adjustments to the position sensor wheel tooth sensor inputs to compensate for position sensor operating conditions. For example, waveform edges generated directly from a tooth wheel and sensed by the position sensor wheel tooth sensor can be adjusted for object or engine speed as well as other conditions that can affect waveform edges. The third plot from the top of FIG. 4 shows the position sensor engine position output and communications between the position sensor and a diagnostic controller. The fourth plot from the top represents engine speed. The X-axis of each plot represents time, and time increases from the left to right side of FIG. 4.

At time to the left of $T_0$, the engine is rotating as the engine speed is shown at a high level. In addition, the input of the position sensor wheel tooth sensor waveform is changing state from a low level to a high level in response to flywheel teeth passing the position sensor as the engine rotates. The position sensor wheel tooth sensor waveform edges are updated in response to the sensor calculations as shown in the second plot from the top of FIG. 4. Each dot on the sensor calculation curve represents an edge position update. Once the position sensor wheel tooth sensor waveform edges are adjusted, the engine position waveform is output from the engine position sensor as shown in the third plot from the top of FIG. 4. Note that the edge timing compensation is small relative to the timings shown in FIG. 4. Therefore, the edge timing adjustments are not discernable between the sensor input waveform and the sensor output waveform.

At time to the right of $T_0$ and continuing to $T_1$, the engine is decelerating to a stop. During engine deceleration, the number of calculations performed by the sensor is reduced since less engine position information is received by the sensor. Nevertheless, the position sensor continues to output a waveform indicative of engine position.

At $T_1$, the sensor calculations cease in response to lack of flywheel input. In one example, the position sensor output goes to a high state after a predetermined amount of time. In one example, the state of the position sensor goes to a high state after a different amount of time when the target is moving in a forward direction as compared to a reverse direction.

At time to the right of $T_1$ and continuing to $T_2$, the engine position sensor monitors the flywheel for input. But, since the engine is not rotating, the position sensor does not detect flywheel teeth, and the position sensor wheel tooth sensor input remains high. Likewise, the position sensor output remains high because of a lack of input to the position sensor from an external controller (e.g., an engine controller or diagnostic controller).

At $T_2$, the position sensor output is toggled by the diagnostic controller. In one example, the circuit shown in FIG. 5 drives the position sensor output to a low logic state as shown at $T_3$. The position sensor simultaneously monitors the position sensor output and the position sensor wheel tooth sensor input. If the sensor detects a change in the position sensor output without detecting an input to the position sensor wheel tooth sensor input, the position sensor interprets the position sensor output as instructions from an external controller.

At time to the right of $T_3$ and continuing to $T_4$, the position sensor monitors the position sensor output for a synchronization pulse. In some examples, the synchronization pulse may occur as described in FIG. 3. In other examples, the position sensor may wait for a different predetermined sequence in the state of the position sensor output before transitioning from the operational mode of outputting engine position to the sensor diagnostic command mode. The synchronization pulse causes the position sensor to enter a diagnostic command mode. Upon entry to the diagnostic command mode, the position sensor waits for instructions from the diagnostic controller requesting desired data.

At time $T_4$, the diagnostic controller sends a plurality of command pulses commanding the position sensor to output different types of sensor data. For example, one instruction may request the amplification level of the target magnetic profile. Another instruction may request peak values for each of the magnetic teeth. In this way, the position sensor may output information specifically requested by the external controller.

At time to the right of $T_5$ and continuing to $T_6$, the position sensor outputs a synchronization pulse to the diagnostic controller indicating that the requested data will follow. After the synchronization pulse is output at $T_6$, the position sensor begins to transmit the requested data to the external controller by changing the state of the position sensor output from $T_6$ to $T_7$.

It should be mentioned that when the engine begins to rotate the position sensor can stop transmitting data other than position information and begin to transmit position information for the object being tracked (e.g., a crankshaft).

Figure 5:
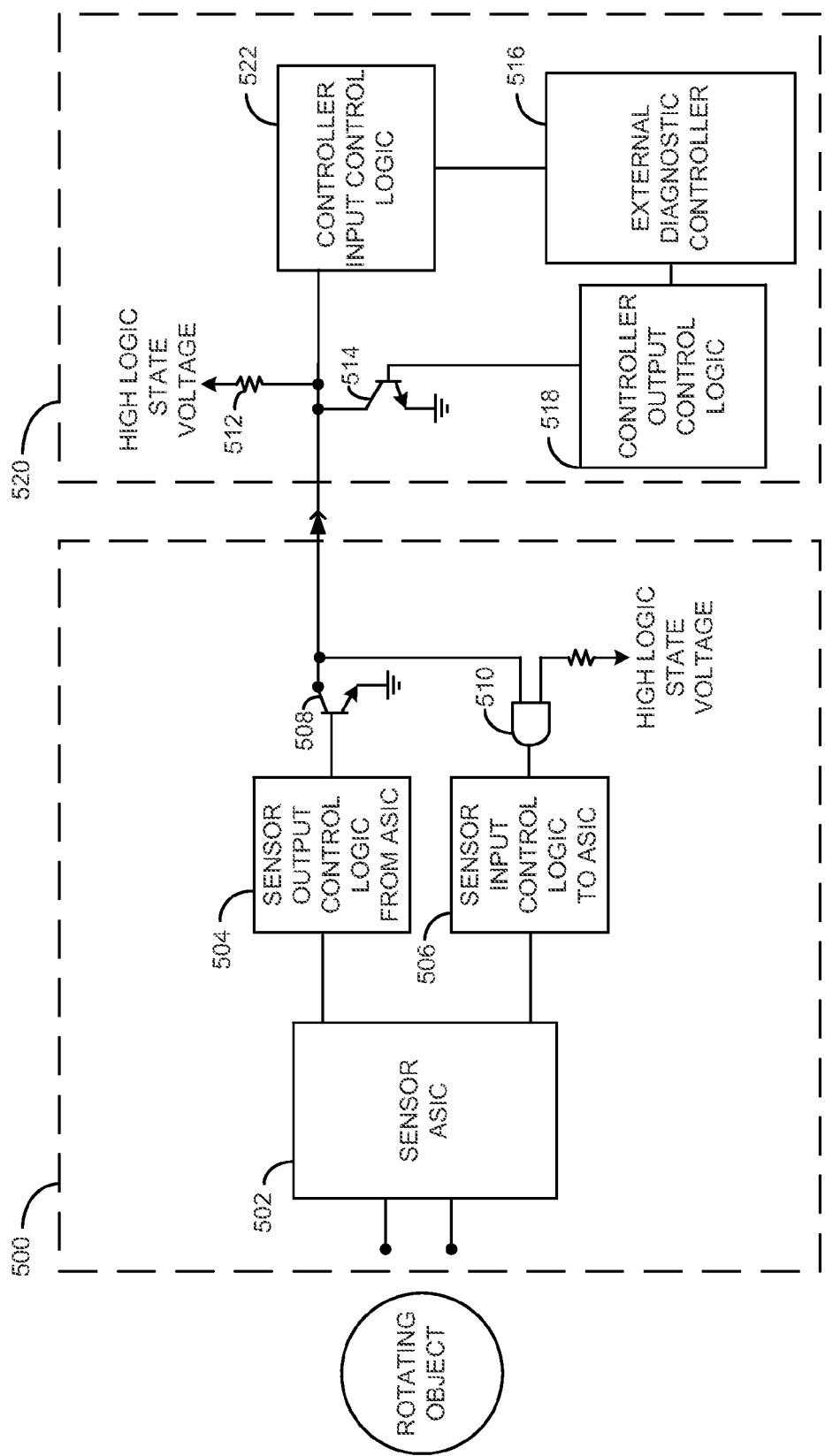
FIG. 5 shows an example position sensor circuit and an example controller circuit.
Figure 6:
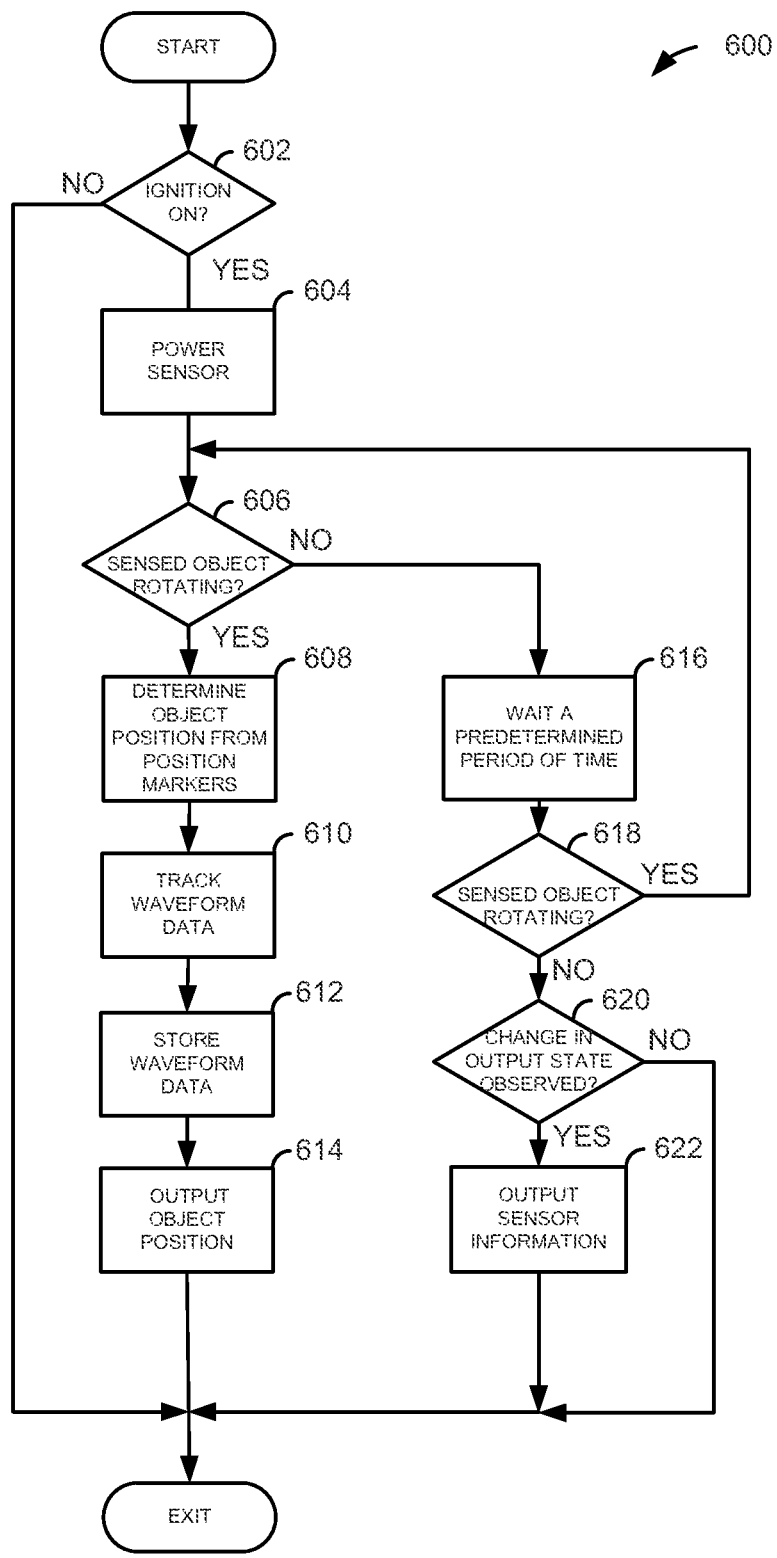
FIG. 6 is an example flowchart of a method for operating a position sensor.

Referring now to FIG. 5, an example position sensor circuit and an example controller circuit are shown. Boundary 500 contains some example components of an example position sensor. In one example, application specific integrated circuit (ASIC) 502 comprises a controller, memory, digital inputs, and digital outputs. In some examples, ASIC 502 includes instructions for adjusting timing of edges sensed from a rotating object. Further, ASIC 502 can store, retrieve, and transmit sensor diagnostic information. For example, ASIC 502 can report a difference in a number of position sensor input transitions as compared to a number of position sensor output transitions. In this way, the ASIC can determine if the position sensor is transmitting accurate position information. In addition, the ASIC can provide and output information related to internal calculations via the position sensor output. For example, the ASIC can output the average and peak timing adjustments made to the position sensor wheel tooth sensor input information. FIG. 6 provides one example method ASIC 502 is capable of executing.

In some examples, ASIC outputs may be routed to control logic 504 before finally being routed to an output transistor 508 or a similar device. Transistor 508 is shown as an NPN device that is normally open. Transistor 508 substantially exposes one side of resistor 515 to ground when transistor 508 is activated. Thus, the collector of transistor 508 is the position sensor output and it assumes a high logic level when transistor 508 is off. The collector of transistor 508 assumes a low logic level state when transistor 508 is on. The output of transistor 508 is routed to ASIC input AND gate 510 and to an input of external controller 520. The output of AND gate 510 is routed to position sensor input logic 506 before it is passed to ASIC 502. In other examples, the output of transistor 508 may be input directly to sensor input control logic 506.

Boundary 520 contains some example components of an example diagnostic or engine controller. In particular, controller 516 is coupled to controller input control logic 522 and controller output control logic 518. Controller 516 is also in communication with output transistor 514 via controller output control logic 518. Position sensor information is input to input control logic 522 and passes to an input of external diagnostic controller 516. External diagnostic controller 516 can control the output state of the position sensor by opening and closing NPN transistor 514. However, external diagnostic controller 516 does not close transistor 514 unless a predetermined set of conditions have occurred. In one example, the output state of the position sensor must be at a predetermined logic level for a predetermined amount of time before transistor 514 is activated. For example, the position sensor output must be at in a high state for a predetermined amount of time before transistor 514 is activated. If transistor 514 is activated and external controller 516 senses a different number of position sensor output transitions at 522 as compared to the number of transitions output by transistor 514, diagnostic external controller 516 deactivates transistor 514 and exits the sensor diagnostic command mode.

It is should be mentioned that other circuit embodiments are anticipated and that FIG. 5 is not intended to limit the scope or breadth of the present description. For example, in some embodiments the NPN transistors may be replaced by PNP transistors. In other embodiments, other output devices may replace the bipolar transistors shown in FIG. 3.

Thus, the systems of FIGS. 1 and 5 include a system for determining a quality of a magnetic sensor profile, comprising: a sensor configured to sense a position of an object, the sensor configured with an output that provides position information of the object to a single output pin while the object is rotating, and the sensor configured to output data associated a quality of a magnetic sensor profile other than the position information of the object via the single output pin when the object is not rotating. The system including where the position information is a square wave related to the position of the object, and where the data associated with the quality of the magnetic sensor profile is determined during a period of rotation of the object during predetermined conditions. The system including where the data associated with the quality of the magnetic sensor profile is transmitted via the single output pin to an external system. The system includes where the external system is an engine controller or a diagnostic tool. The system includes where the sensor is an engine position sensor or a transmission sensor. The system includes where the sensor includes an ASIC with instructions to make adjustments to the position information during rotation of the object before the position information is output. The system includes where the sensor includes an ASIC with instructions for entering a diagnostic mode after the external system changes a state of the single output pin, the ASIC including further instructions for transmitting data associated at least one of internally stored waveform data, diagnostic codes, and sensor status codes.

In addition, the systems of FIGS. 1 and 5 provide for a system for determining a position of a rotating object, comprising: a sensor with a first controller having instructions for sensing a position of an object, the first controller having further instructions for outputting position information of the object via a single output pin while the object is rotating, and the first controller having further instructions for outputting data associated with a quality of a magnetic sensor profile other than the position information of the object the single output pin when the object is not rotating; and a second controller, the second controller external of the sensor and including instructions for adjusting a state of the single output pin after the object stops rotating. The system includes where the second controller includes further instructions for interpreting the information other than the position information. The system includes where the second controller includes further instructions for controlling an engine including stopping the engine from rotating, and where the second controller adjusts a state of the single output pin after stopping the engine. The system includes where the sensor outputs the data associated with the quality of the magnetic sensor profile from the single output pin in a digital format, and where the data associated with the quality of the magnetic sensor profile is data related to rotation of the object, and where the data associated with the quality of the magnetic sensor profile is determined during a period of rotation of the object during predetermined conditions. The system includes where the second controller is an engine controller, a diagnostic controller, or a controller of a vehicle.

Referring now to FIG. 6, an example flowchart of a method for operating a sensor is shown. The method of FIG. 6 may be executed by a position sensor as shown in FIGS. 1 and 5.

At 602, method 600 judges whether or not the vehicle ignition system is on or if a vehicle is in a state that permits engine starting. If so, method 600 proceeds to 604. Otherwise, method 600 proceeds to exit.

At 604, method 600 provides power to the position sensor. In one example, power may be provided to the sensor by a battery. In another example, regulated power is provided to the position sensor via a controller (e.g., controller 10 of FIG. 1). Method 600 proceeds to 606 after power is delivered to the position sensor.

At 606, method 600 judges whether or not rotation of a sensed object has been detected. The sensed object may be a transmission component (e.g., turbine sensor or output shaft sensor) or an engine component (e.g., camshaft or crankshaft). The object is sensed by a wheel tooth sensor input of the position sensor. In one example, the wheel tooth sensor input is a Hall Effect device. If method 600 judges that a rotating or moving object is detected, method 600 proceeds to 608. Otherwise, method 800 proceeds to 616.

At 608, method 600 determines position of a rotating or moving object by sensing a change in a logic level. For example, a sensor input may be driven from a low state to a high state when a wheel tooth or other position artifact is sensed. Method 600 proceeds to 610 after a position has been determined.

At 610, method keeps track of position sensor input from the rotating or moving object by storing the position information to memory. The position information is tracked so that variables such as amplitude, average frequency, period, and signal transition times may be determined. In one example, the tracked information may be used to anticipate an edge transition so that the position of the rotating object can be reported to an external controller with little or no delay. In addition, other waveform data may also be tracked such as the timing adjustments that the position sensor makes to signals that represent the position of the rotating or moving object. Method 600 proceeds to 612 after waveform tracking is completed.

At 612, method 600 stores tracked waveform information from the position sensor input as well as calculated variables to memory. The information is stored and may be retrieved for use at a later time. In one example, an ASIC stores information related to each tooth of a sensed target gear wheel to memory. Method 600 proceeds to 614 after the information is stored to memory.

At 614, method 600 outputs the position of the sensed object. In one example, the position information is output in the form of a digital pulse train. The timing of edge transitions of the pulses of the digital pulse train may be adjusted in response to the speed of the sensed object. Further, in some examples, the timing of edge transitions may be adjusted to account for environmental variables such as temperature. Method 600 proceeds to exit after the object position is updated.

At 616, method 600 waits for a predetermined amount of time before taking any action after motion of a sensed object has not been detected. In one example, the amount of time may be related to the lowest expected speed of the moving or rotating object. For example, an engine can be expected to turn at more than 200 RPM during cranking. Therefore, by knowing the number of engine position markers in one engine revolution, an amount of time between engine position markers can be determined for engine speeds greater than 200 RPM. If the present time between engine markers is much greater than the time between engine markers at 200 RPM, it may be determined that the engine or object is not moving. Method 600 proceeds to 618 after the waiting period has expired.

At 618, method 600 judges whether or not the tracked object (e.g., engine crankshaft) is rotating or moving. If not, method 600 proceeds to 620. Otherwise, method 600 returns to 606.

At 620, method 600 monitors the position sensor output for a change in state. Further in some examples, method 600 continues to monitor the sensor wheel tooth sensor input for determining if the tracked object begins to move. If the tracked object begins to move, method 600 returns to 606. If method 600 judges that the output has changed state without input from the wheel tooth sensor input, method 600 judges that an external controller may be requesting stored sensor data. Method 600 waits for at least one predetermined sequence of a plurality of possible sequences before proceeding to send sensor information to the sensor output (e.g., sequence of FIG. 3). If method 600 judges that a predetermined sequence is observed at the position sensor output, method 600 proceeds to 622. Otherwise, method 600 proceeds to exit so that method 400 may be executed again.

In some examples, method 600 may also return to 606 if a new instruction from the diagnostic controller commands the sensor to return to operational mode. Further, the position sensor returns to operational mode in response to power loss by the position sensor.

At 622, method 600 outputs sensor information to the sensor output. In one example, the position sensor information is output in a digital format to the sensor output pin. Based on the request from the diagnostic controller, the sensor can output selected information according to the request by the diagnostic controller. Further, in some examples, the position sensor may output all stored position sensor information. The stored sensor information can include diagnostic information (e.g., self check data), status information (e.g., internal voltage data), and/or calculated waveform information (e.g., signal edge timing adjustments, average time between input pulses, maximum and minimum time between pulses, etc.). Once the position sensor sends the requested information the sensor output is set to a desired state (e.g., a high or low level logic state). Method 600 proceeds to exit after the position sensor output is set to a desired state.

Figure 7:
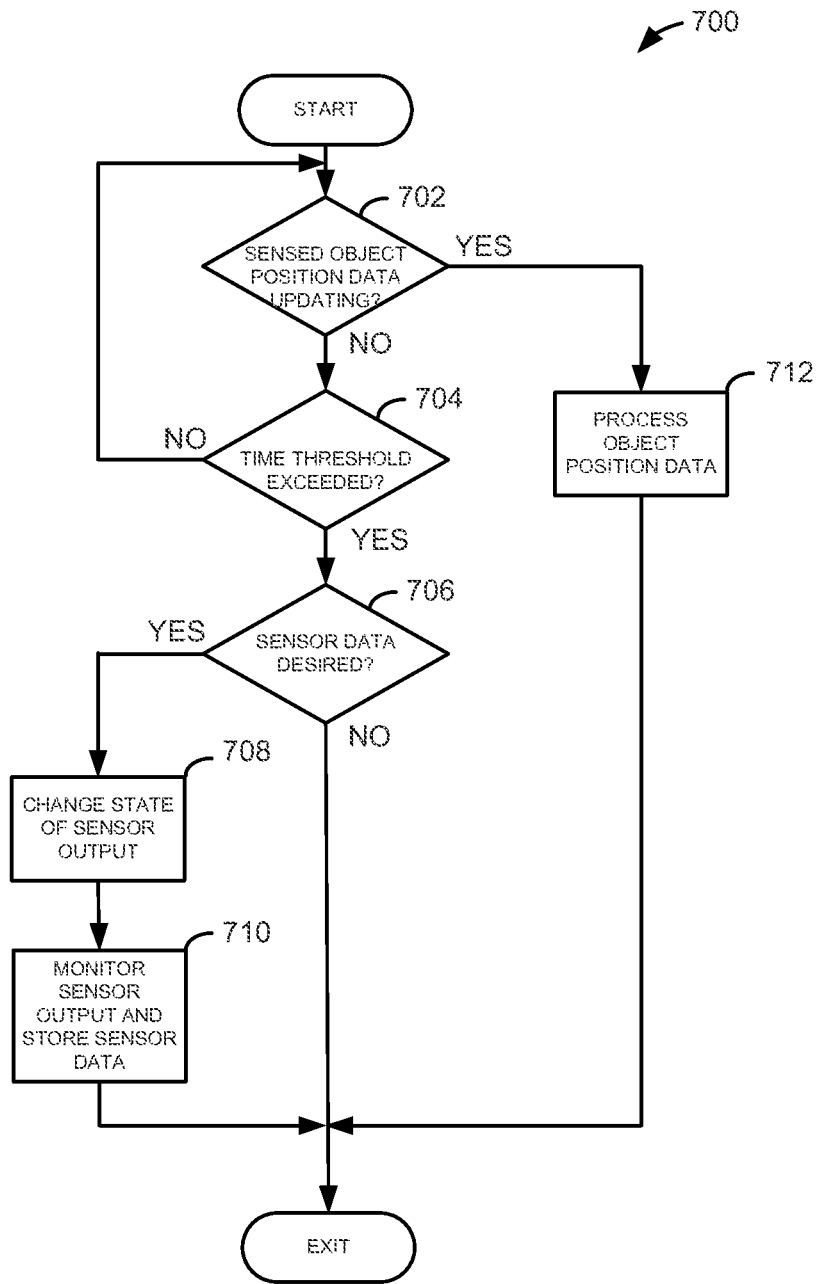
FIG. 7 is an example flowchart of a method for operating an external controller that is in communication with a position sensor.

Referring now to FIG. 7, an example flowchart of a method for operating an external controller that is in communication with a position sensor is shown. At 702, method 700 judges whether or not position information for the object sensed by the position sensor is being updated. In one example, method 700 compares the time between edges of a pulse train with a predetermined time. If the time between pulse edges of the position sensor output is less than the predetermined time, method 700 judges that the object position is being updated and method 700 proceeds to 712. If the time between pulse edges of the position sensor output is greater than the predetermined time, method 700 judges that the object position is not being updated, and therefore, the object must be at rest. If method 700 determines that the object position information is not being updated, method 700 proceeds to 704.

At 704, method 700 judges whether or not the time between edges of the position sensor output exceeds a predetermined time. If not, method 700 returns to 702. Otherwise, method 700 proceeds to 706.

At 706, method judges whether or not position sensor data is desired. In one example, position sensor data is requested at predetermined intervals, every ten operating cycles for example. In another example, method 700 requests position sensor information if a request to start the engine has been made and if an expected output from the position sensor has not been detected. In another example, sensor information can be requested in response to an operator request from a diagnostic tool for example. If method 700 determines sensor information is not desired, method 700 proceeds to exit. Otherwise, method 700 proceeds to 708.

At 708, method 700 changes the state of the sensor output to indicate to the position sensor that the diagnostic controller is requesting position sensor information. In one example, method 700 performs a predetermined output sequence as shown in FIG. 3 to request position sensor information. Method 700 proceeds to 710 after the external controller adjusts the state of the position sensor output. In one example, the circuit described in FIG. 5 changes the state of the position sensor output.

At 710, method 700 monitors the position sensor output of the position sensor for the requested position sensor information. In one example, method 700 monitors the position sensor output for a change in position sensor output for a predetermined amount of time after the position sensor information is requested. In particular, method 700 waits for a synchronization pulse. If the position sensor information is sent by the position sensor via the position sensor output, method 700 reads the position sensor information and stores the information to memory for subsequent processing. On the other hand, if the position sensor information is not observed at the position sensor output by the external controller, the external controller may make a second request for the position sensor information. Method 700 proceeds to exit after monitoring the position sensor output for the requested position sensor information.

At 712, method 700 processes the position sensor object position information. In one example, method 700 determines the rotational position of the sensed object from the position information provided by the position sensor. Further, method 700 can determine the speed and acceleration of the sensed object from the object position information. Method 700 proceeds to exit after processing the object position information.

It should be mentioned that the description anticipates other types of position sensor inputs different from wheel tooth sensor inputs. For example, optical disk sensors may be substituted for wheel tooth sensors.

Thus, the methods of FIGS. 6 and 7 provide for a method for assessing quality of a magnetic sensor profile, comprising: during rotation of an object sensed by a position sensor, storing data associated with a quality of a magnetic sensor profile within the position sensor, and outputting position data (e.g., a square wave indicating angular position of a rotating object, the square wave representing to position of teeth located on the rotating object); and during non-rotation of the object, outputting at least a portion of the data associated with the quality of the magnetic sensor profile via the pin. The method includes where the at least a portion of the data associated with the quality of the magnetic sensor profile is output after an external system changes the state of an output of the position sensor while the object is not rotating and while the sensor is powered. The method includes where the quality of the magnetic sensor profile includes data related to the amplification of a magnetic profile. The method includes where the object is an engine crankshaft and where the data associated with the quality of the magnetic sensor profile is output to an engine controller or a diagnostic tool. The method includes where the at least a portion of the data associated with the quality of the magnetic sensor profile is related to a tooth of the object. The method includes where the at least a portion of the data associated with the quality of the magnetic sensor profile is output from a digital output of the position sensor, and where the digital output of the position sensor is routed to an input of the position sensor. The method includes where an external controller changes the digital output from a first logic state to a second logic state after the object stops rotating, and where the position sensor outputs the at least a portion of the data associated with the quality of the magnetic sensor profile after the external controller changes the digital output from the first logic state. The method includes where the position sensor is a transmission position sensor or an engine position sensor.

As will be appreciated by one of ordinary skill in the art, methods described in FIGS. 6-7 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for assessing quality of a magnetic sensor profile, comprising:
   during rotation of an object sensed by a position sensor, storing data associated with the quality of the magnetic sensor profile within the position sensor, and outputting position data via a pin of the position sensor; and
   during non-rotation of the object, outputting at least a portion of the data associated with the quality of the magnetic sensor profile via the pin.

2. The method of claim 1, where the at least the portion of the data associated with the quality of the magnetic sensor profile is output after an external system changes a state of an output of the position sensor while the object is not rotating and while the sensor is powered.

3. The method of claim 2, where the quality of the magnetic sensor profile includes data related to an amplification of a magnetic profile.

4. The method of claim 2, where the at least the portion of the data associated with the quality of the magnetic sensor profile is related to a tooth of the object.

5. The method of claim 1, where the object is an engine crankshaft and where the data associated with the quality of the magnetic sensor profile is output to an engine controller or a diagnostic tool.

6. The method of claim 1, where the at least the portion of the data associated with the quality of the magnetic sensor profile is output from the pin, the pin being a digital output of the position sensor, and where the digital output of the position sensor is routed to an input of the position sensor.

7. The method of claim 6, where an external controller changes the digital output from a first logic state to a second logic state after the object stops rotating, and where the position sensor outputs the at least the portion of the data associated with the quality of the magnetic sensor profile after the external controller changes the digital output from the first logic state.

8. The method of claim 1, where the position sensor is a transmission position sensor or an engine position sensor.

9. A system for determining a quality of a magnetic sensor profile, comprising:
a sensor configured to sense a position of an object, the sensor configured with an output that provides position information of the object to a single output pin while the object is rotating, and the sensor configured to output data associated with the quality of the magnetic sensor profile other than the position information of the object via the single output pin when the object is not rotating.

10. The system of claim 9, where the position information is a square wave related to the position of the object, and where the data associated with the quality of the magnetic sensor profile is determined during a period of rotation of the object during predetermined conditions.

11. The system of claim 9, where the data associated with the quality of the magnetic sensor profile is transmitted via the single output pin to an external system.

12. The system of claim 11, where the external system is an engine controller or a diagnostic tool.

13. The system of claim 11, where the sensor is an engine position sensor or a transmission sensor.

14. The system of claim 11, where the sensor includes an application specific integrated circuit with instructions to make adjustments to the position information during rotation of the object before the position information is output.

15. The system of claim 11, where the sensor includes an application specific integrated circuit with instructions for entering a diagnostic mode after the external system changes a state of the single output pin, the ASIC including further instructions for transmitting data associated with at least one of internally stored waveform data, diagnostic codes, and sensor status codes.

16. A system for determining a position of a rotating object, comprising:
a sensor with a first controller having instructions for sensing a position of an object, the first controller having further instructions for outputting position information of the object via a single output pin while the object is rotating, and the first controller having further instructions for outputting data associated with a quality of a magnetic sensor profile other than the position information of the object via the single output pin when the object is not rotating; and
a second controller, the second controller external of the sensor and including instructions for adjusting a state of the single output pin after the object stops rotating.

17. The system of claim 16, where the second controller includes further instructions for interpreting the information other than the position information.

18. The system of claim 16, where the second controller includes further instructions for controlling an engine including stopping the engine from rotating, and where the second controller adjusts the state of the single output pin after stopping the engine.

19. The system of claim 16, where the sensor outputs the data associated with the quality of the magnetic sensor profile from the single output pin in a digital format, and where the data associated with the quality of the magnetic sensor profile is data related to rotation of the object, and where the data associated with the quality of the magnetic sensor profile is determined during a period of rotation of the object during predetermined conditions.

20. The system of claim 16, where the second controller is an engine controller, a diagnostic controller, or a controller of a vehicle.

\* \* \* \* \*